(12) United States Patent
Mescher et al.

(10) Patent No.: US 7,526,992 B2
(45) Date of Patent: May 5, 2009

(54) VARIABLE FORCE RATE VACUUM BOOSTER

(75) Inventors: Patrick A. Mescher, Bellbrook, OH (US); Kiron Bhaskar, Morrow, OH (US); Roger S Sexton, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 252 days.

(21) Appl. No.: 11/706,115

(22) Filed: Feb. 13, 2007

(65) Prior Publication Data

US 2008/0190281 A1    Aug. 14, 2008

(51) Int. Cl.
*B60T 13/52* (2006.01)
*B60T 8/32* (2006.01)
(52) U.S. Cl. .................................. 91/369.2
(58) Field of Classification Search ............ 91/369.1, 91/369.2
See application file for complete search history.

(56) References Cited

U.S. PATENT DOCUMENTS

| | | | | |
|---|---|---|---|---|
| 5,014,597 A * | 5/1991 | Rueffer et al. | ............. | 91/369.2 |
| 6,269,731 B1 * | 8/2001 | Gautier et al. | ............. | 91/369.2 |
| 6,494,125 B2 * | 12/2002 | Hannus et al. | ............. | 91/369.2 |
| 6,931,979 B2 * | 8/2005 | Bacardit et al. | ............. | 91/369.2 |

* cited by examiner

*Primary Examiner*—Thomas E Lazo
(74) *Attorney, Agent, or Firm*—Thomas N. Twona

(57) ABSTRACT

A variable force rate vacuum booster including a reaction disk having an input surface and an output surface, the reaction disk being formed from a deformable material, an input rod position relative to the reaction disk to apply an input force to the input surface of the reaction disk, an output rod having a reaction surface generally engaged with the output surface of the reaction disk, the output rod defining a bore therein, and a plunger positioned in the bore and biased out of the bore by a biasing force, the plunger being adapted to resist deformation of the reaction disk into the bore until the input force reaches a threshold value.

20 Claims, 10 Drawing Sheets

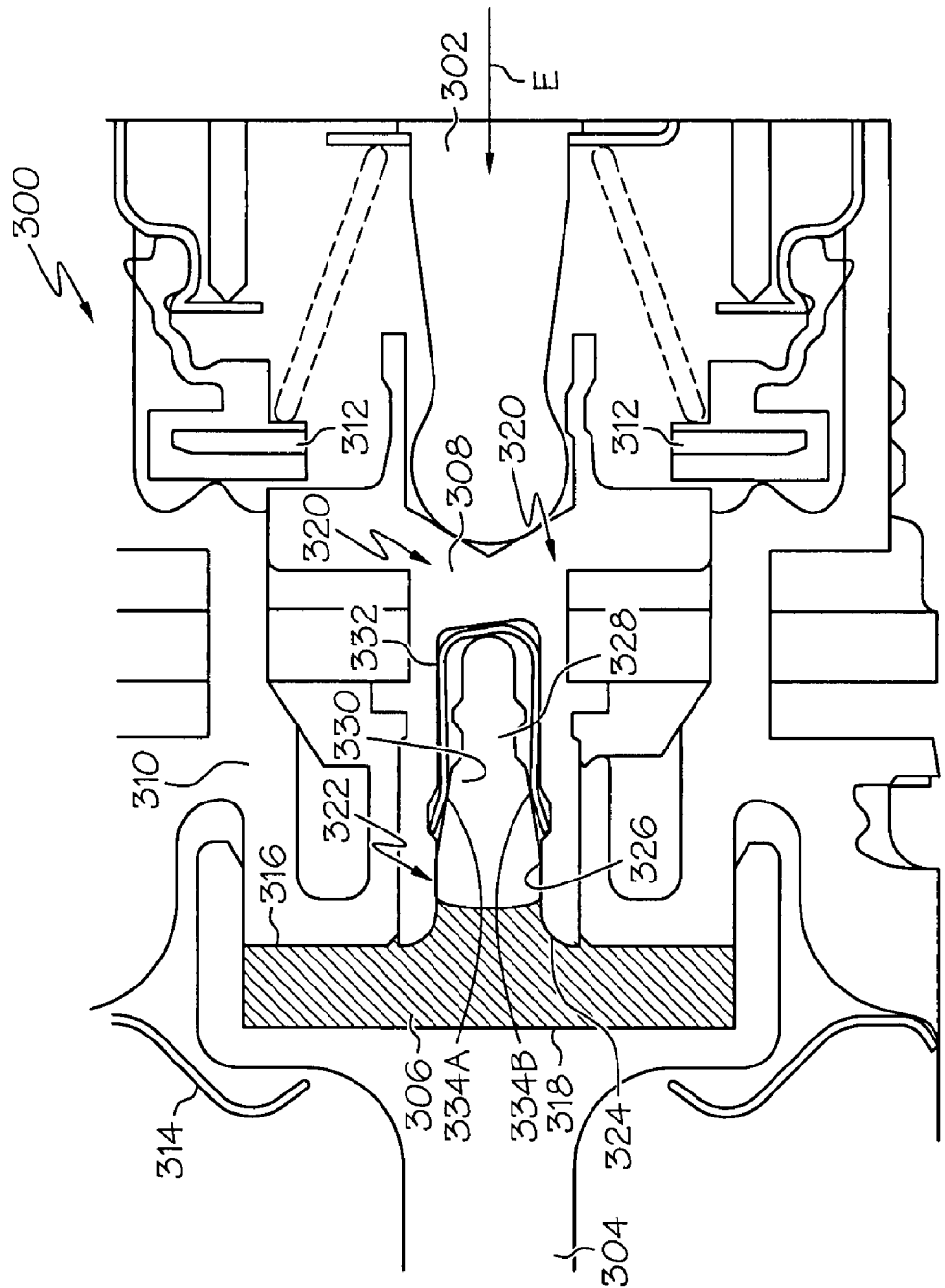

# VARIABLE FORCE RATE VACUUM BOOSTER

BACKGROUND

The present application relates to vacuum boosters and, more particularly, to variable output force rate brake system vacuum boosters.

Modern automotive braking systems typically include a vacuum booster capable of magnifying the brake input force supplied from the brake pedal. Vacuum boosters typically utilize the vacuum created by the engine, or a separate vacuum source, to create a pressure differential within the booster that in turn creates the desired force gain. The force gain of a vacuum booster may be defined as the magnitude of the output force created by the vacuum booster per unit of input force from the brake pedal.

Traditionally, the force gain has been constant throughout the normal range of use. However, there is now a desire to provide additional safety functionality to the brake system by creating a larger force gain after a predetermined threshold input force value has been reached, as shown in FIG. 1. Specifically, a higher force gain characteristic in the upper range of pedal input force will allow the brake system to provide the vehicle driver with the ability to achieve greater deceleration capability relative to a standard single gain vacuum booster.

Accordingly, there is a need for a vacuum booster capable of generating a variable output force gain without affecting the normal operating range of the vacuum booster and only under conditions requiring high output force, such that the vacuum booster operates generally seamlessly to drivers.

SUMMARY

In one aspect, the disclosed variable force rate vacuum booster includes a reaction disk having an input surface and an output surface, the reaction disk being formed from a deformable material, an input rod position relative to the reaction disk to apply an input force to the input surface of the reaction disk, an output rod having a reaction surface generally engaged with the output surface of the reaction disk, the output rod defining a bore therein, and a plunger positioned in the bore and biased out of the bore by a biasing force, the plunger being adapted to resist deformation of the reaction disk into the bore until the input force reaches a threshold value.

In another aspect, the disclosed variable force rate vacuum booster includes a reaction disk having an input surface and an output surface, the reaction disk being formed from a deformable material, an output rod having a reaction surface generally engaged with the output surface of the reaction disk, a power piston having an input surface generally engaged with the input surface of the reaction disk to apply an input force to the reaction disk, the power piston defining at least one bore in the input surface of the power piston, and a plunger positioned in the bore and biased out of the bore by a biasing force, the plunger being adapted to resist deformation of the reaction disk into the bore until the input force reaches a threshold value.

In another aspect, the disclosed variable force rate vacuum booster includes a reaction disk having an input surface and an output surface, the reaction disk being formed from a deformable material, an output rod having a reaction surface generally engaged with the output surface of the reaction disk, an air valve having an input surface generally engaged with the input surface of the reaction disk to apply an input force to the reaction disk, the air valve defining a bore in the input surface of the air valve, and a plunger positioned in the bore and biased out of the bore by a biasing force, the plunger being adapted to resist deformation of the reaction disk into the bore until the input force reaches a threshold value.

Other aspects of the disclosed variable force rate vacuum booster will become apparent from the following description, the accompanying drawings and the appended claims.

BRIEF DESCRIPTION OF THE DRAWINGS

FIG. 5B is a side cross-sectional view of the variable force rate vacuum booster of FIG. 5A showing the force of the locking spring being overcome and a portion of the reaction disk being extruded into the air valve;

DETAILED DESCRIPTION

Figure 1:
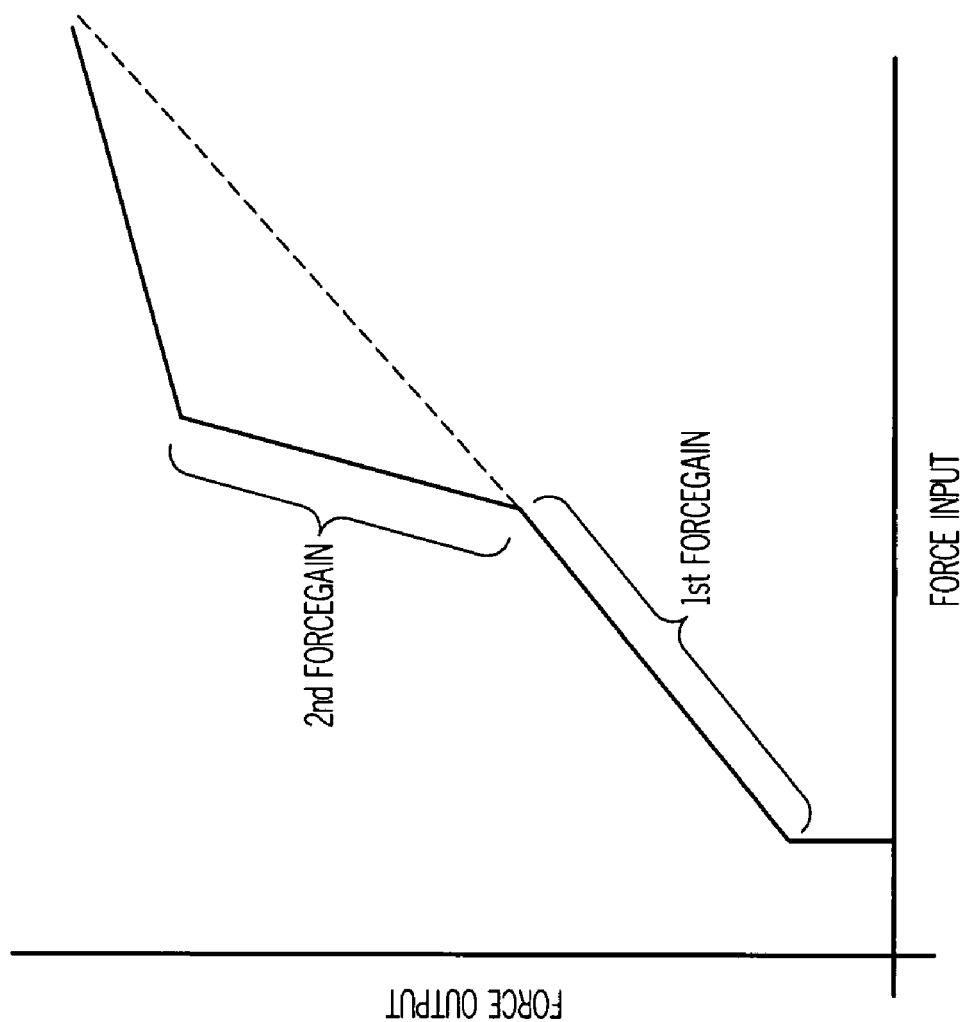
FIG. 1 is a graphical illustration of the force output versus force input of a vacuum booster.
Figure 2:
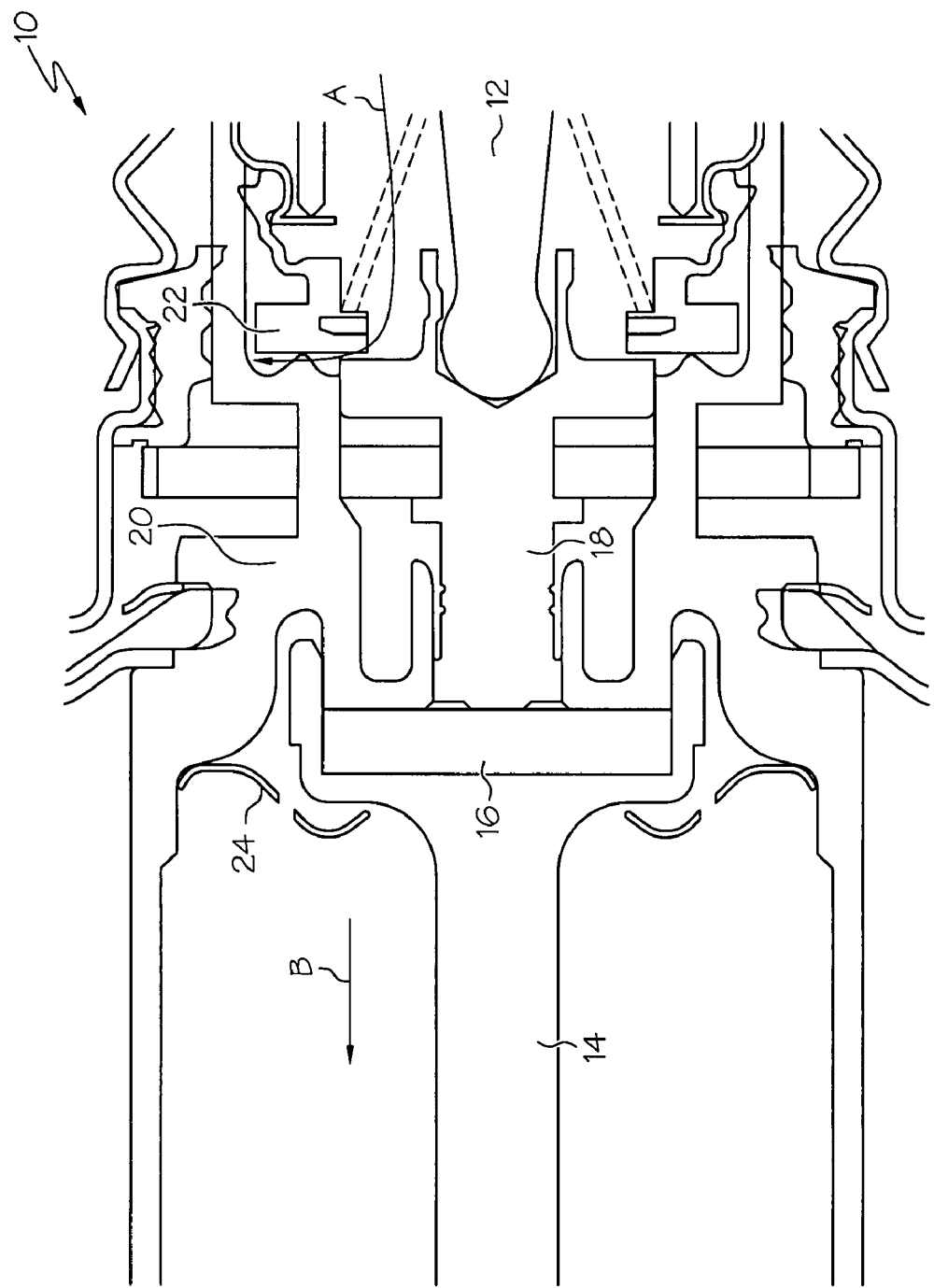
FIG. 2 is a cross-sectional view of a prior art vacuum booster.

Referring to FIG. 2, a vacuum booster, generally designated 10, typically includes an input rod 12, an output rod 14, a reaction disk 16, an air valve 18, a power piston 20, a floating control valve 22 and a diaphragm 24.

When the input rod 12 moves the air valve 18 sufficiently relative to the floating control valve 22, a flow path, shown by arrow A, is opened allowing atmospheric air pressure to act upon the diaphragm 24. Because the area of the diaphragm 24 is subject to a pressure differential created by vacuum pressure on one side of the diaphragm 24 and atmospheric pressure on the other side, the pressure differential creates a large force on the diaphragm 24, thereby driving the diaphragm 24 in a distal direction, shown by arrow B. The force acting on the diaphragm 24 urges the power piston 20 in the distal direction until the power piston 20 is aligned with the air valve 18, thereby closing the floating control valve 22 and stopping the flow of air.

The ideal output force gain G of a vacuum booster is a function of the area $A_{out}$ of the output reaction surface and the area $A_{in}$ of the input surface (e.g., the input surface of the air valve 18 and power piston 20, as shown by Equation 1:

$$G \equiv \frac{A_{out}}{A_{in}}$$

Therefore, the output force gain G may be increased by effectively increasing the area $A_{out}$ of the output rod 14 and/or effectively decreasing the area $A_{in}$ of the input surface.

Figure 3A:
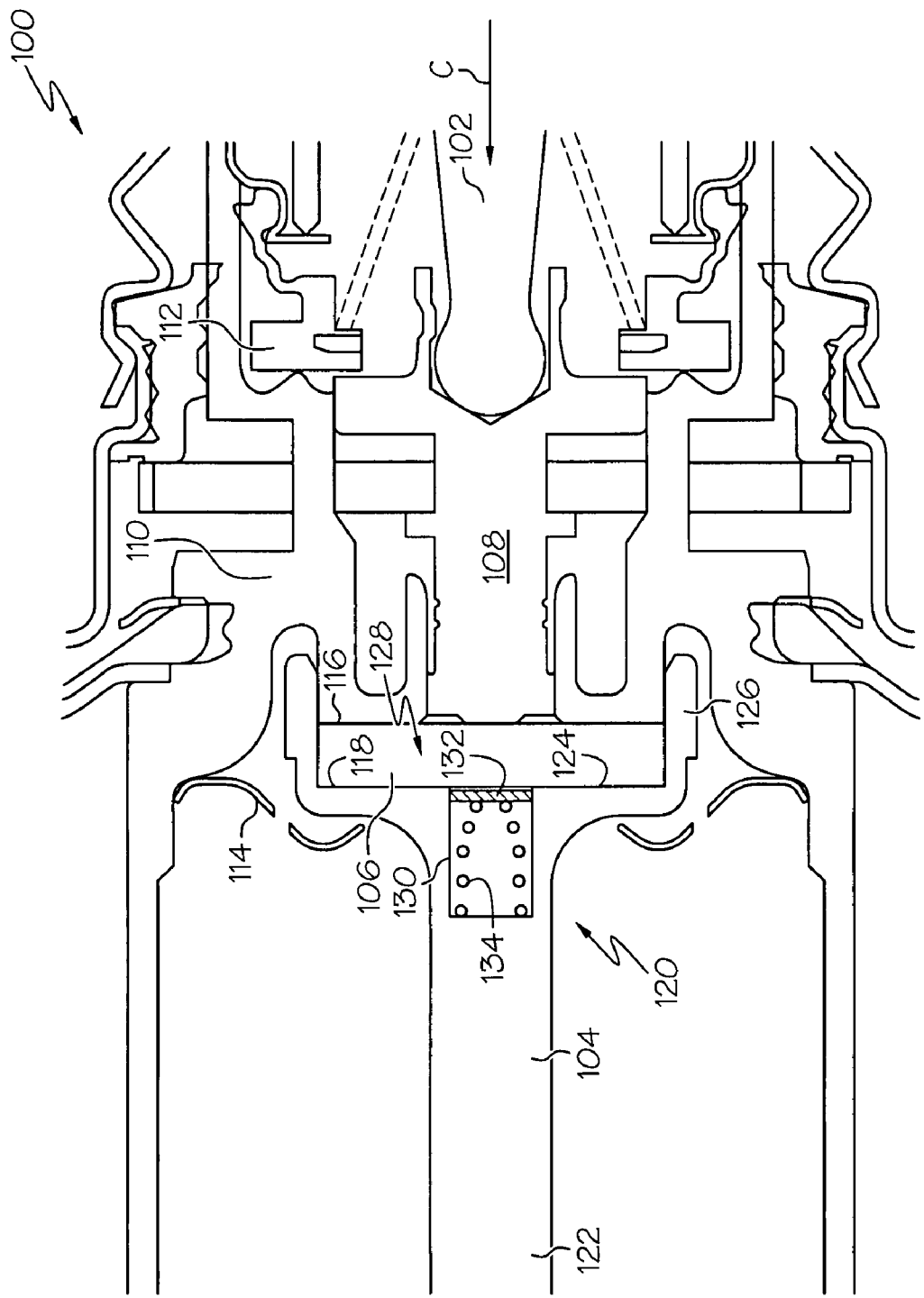
FIG. 3A is a side cross-sectional view of a first aspect of the disclosed variable force rate vacuum booster.

Referring to FIG. 3A, a first aspect of the disclosed variable force rate vacuum booster, generally designated 100, may include an input rod 102, an output rod 104, a reaction disk 106, an air valve 108, a power piston 110, a floating control valve seat 112 and a diaphragm 114. The reaction disk 106 may have an input surface 116 and an output surface 118 and may be formed from deformable material, such as hard rubber, plastic or the like. The output rod 104 may include a proximal end 120 and an elongated rod 122.

Figure 3B:
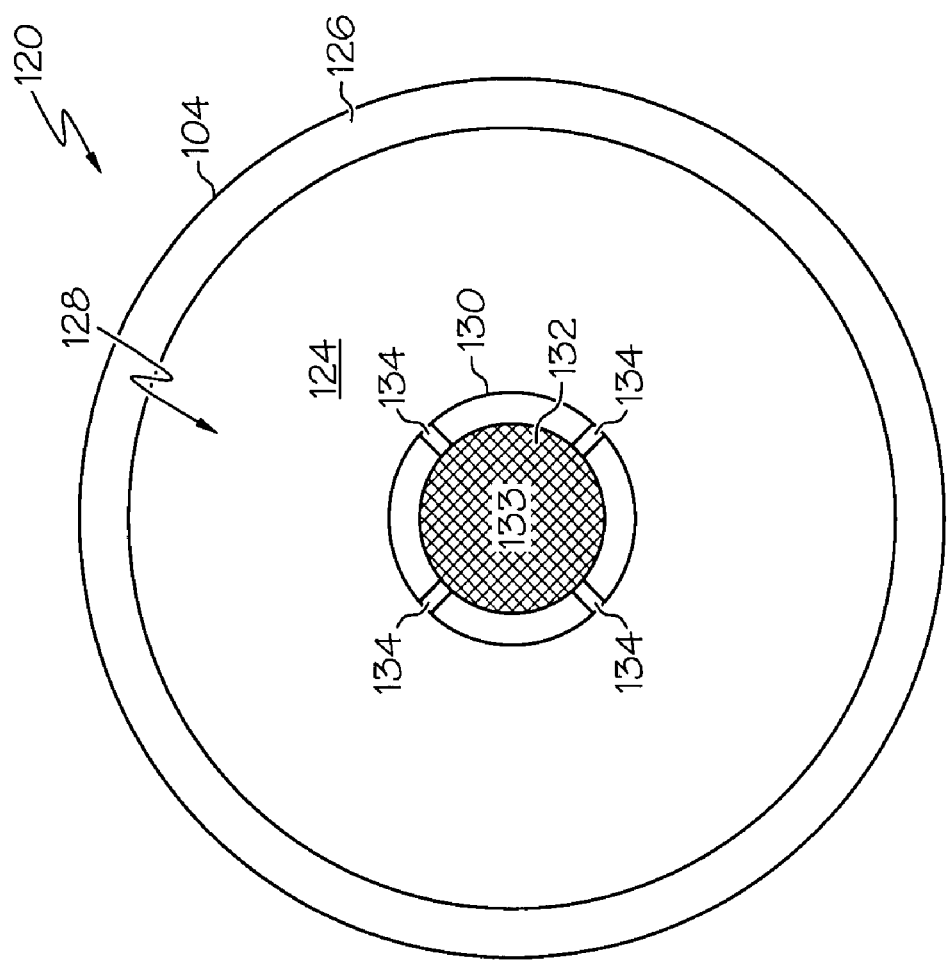
FIG. 3B is a front elevational view of the output rod of the vacuum booster of FIG. 3A.

Referring to FIGS. 3A and 3B, the proximal end 120 of the output rod 104 may include a reaction surface 124 that may be sized to generally flushly engage the output surface 118 of the reaction disk 106. Optionally, a lip 126 may extend from the outer perimeter of the reaction surface 124 of the output rod 104 to create a recess 128 into which the reaction disk 106 may be received. The reaction disk 106 and corresponding recess 128 may be generally cylindrical in shape.

A bore 130 may be formed in the reaction surface 124 of the output rod 104. Additional bores (not shown) may also be used without departing from the scope of the present disclosure. The bore 130 may have various shapes and sizes and may extend into the elongated rod 122 of the output rod 104. In one aspect, the bore 130 may be aligned with the axis of the elongated rod 122 of the output rod 104. Those skilled in the art will appreciate that the bore 130 may be formed using any available techniques, such as drilling, machining, cutting or the like.

A plunger 132 may be closely and slidably received within the bore 130. The plunger 132 may have a diameter (or length and width) closely corresponding with the diameter (or length and width) of the bore 130. Further, the plunger 132 may have various axial lengths (e.g., about 1 to about 50 percent of the length of the bore 130). In one aspect, the bore 130 and the plunger 132 may be generally cylindrical in shape.

A spring 134 may be positioned in the bore 130 to urge the plunger 132 out of the bore 130 and resist the forces urging the plunger 132 into the bore 130. The spring 134 may be a coil spring or other collapsible spring and may have a sufficient resistive force to resist movement of the plunger 132 into the bore 130. In one aspect, the plunger 132 may be biased to a position such that the reaction surface 133 of the plunger 132 is generally flush with the reaction surface 124 of the output rod 104.

Figure 3C:
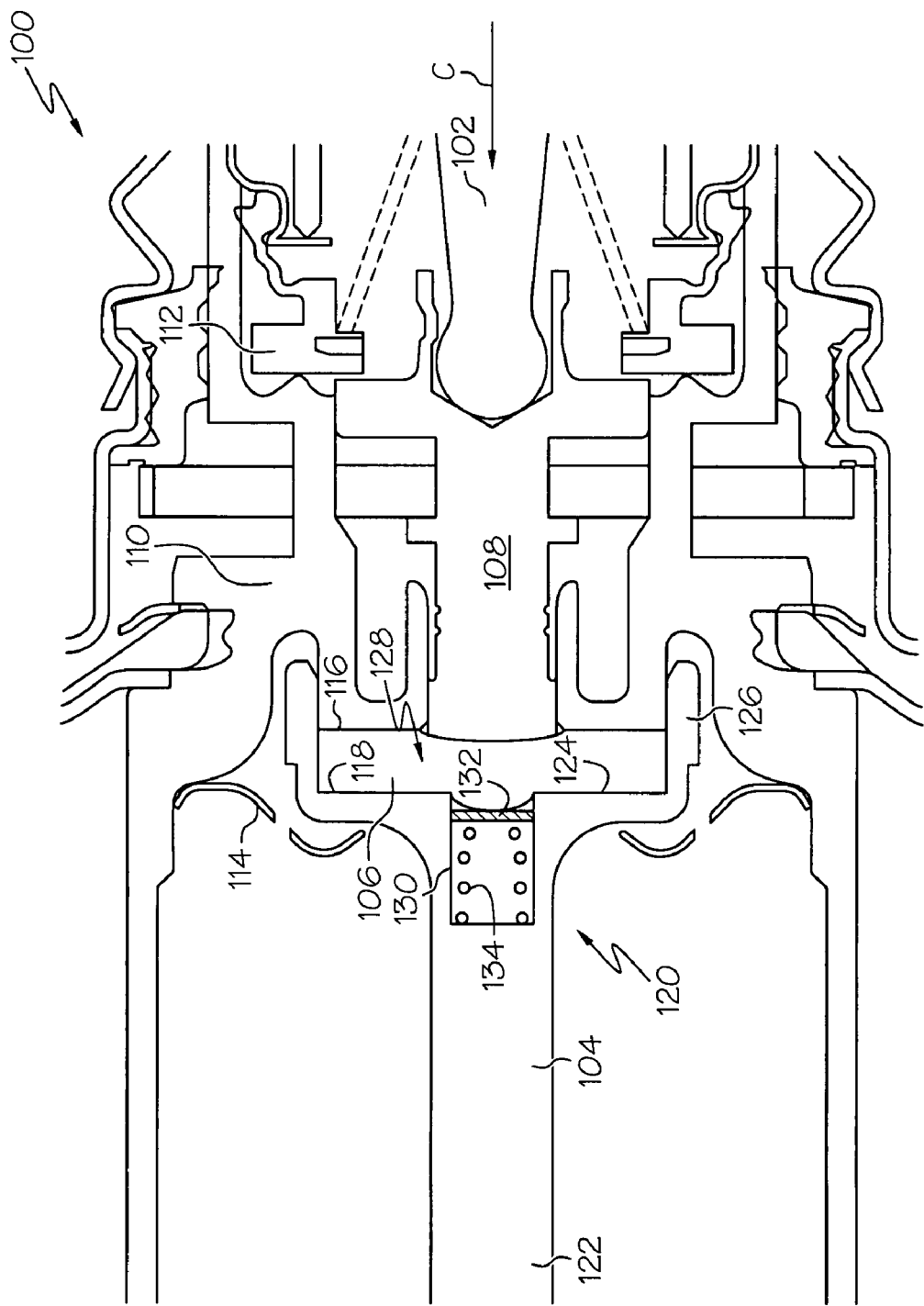
FIG. 3C is a side cross-sectional view of the vacuum booster of FIG. 3A showing a portion of the reaction disk extruded into the bore in the output rod, thereby providing a second, greater output force gain.

Referring to FIG. 3A, when an input force (arrow C) is applied to the reaction disk 106 by the input rod 102, the spring 134 may initially resist the force and maintain the plunger 132 in the proximal position (e.g., flush with the reaction surface 124 of the output rod). However, as shown in FIG. 3C, when the force of the spring 134 is overcome by the input force (arrow C) such that the plunger 132 is urged in the distal direction against the bias of the spring 134, a portion of the reaction disk 106 may be deformed (e.g., extruded) into the bore 130, thereby effectively increasing the area $A_{out}$ of the output reaction surface and resulting in an increased output force gain G (see Equation 1).

Thus, a second, higher output force gain G may be provided when the input force (arrow C) is sufficiently high to overcome the resistive force of the spring 134 in the output rod 104.

Figure 4:
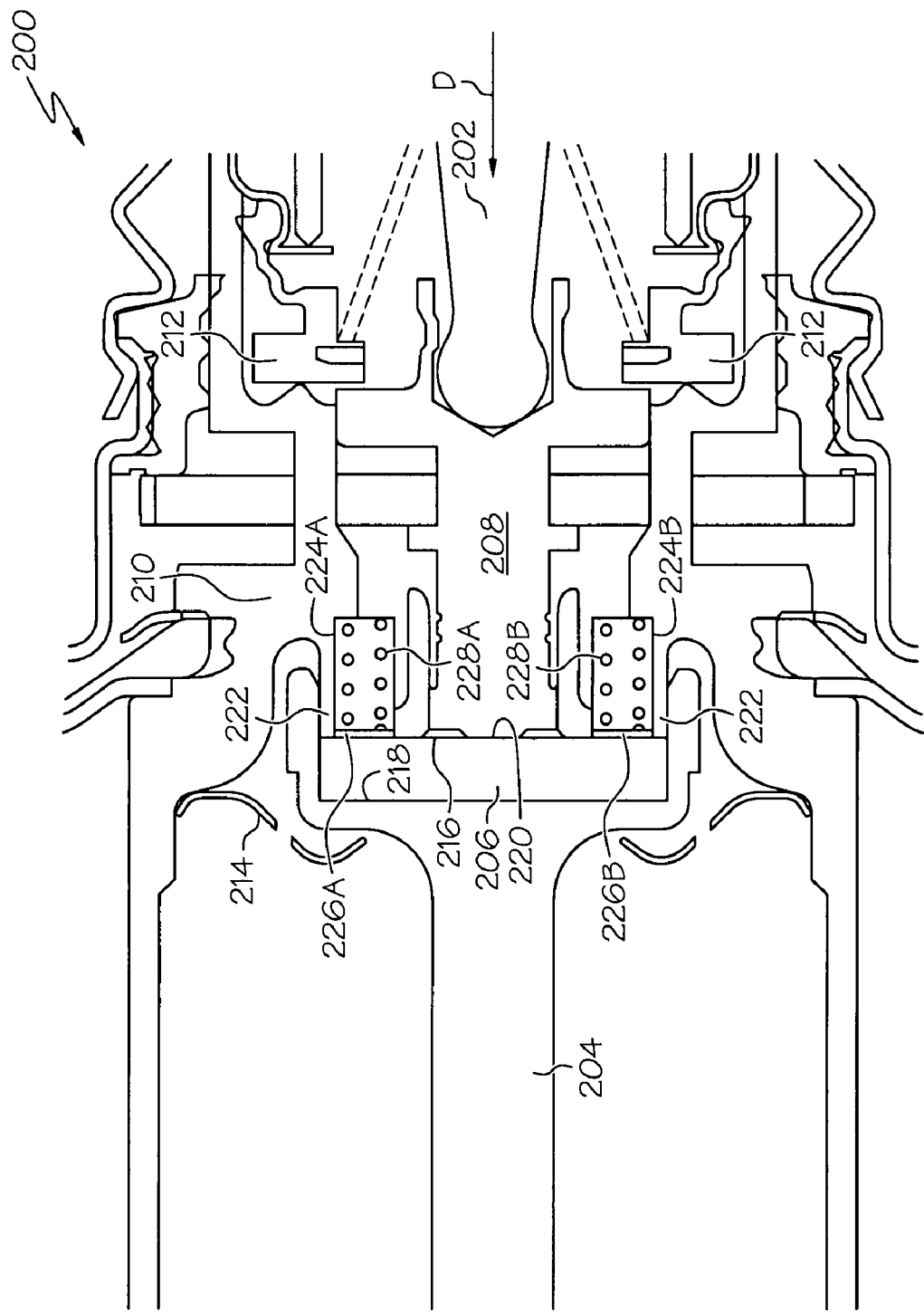
FIG. 4 is a side cross-sectional view of a second aspect of the disclosed variable force rate vacuum booster.

Referring to FIG. 4, a second aspect of the disclosed variable force rate vacuum booster, generally designated 200, may include an input rod 202, an output rod 204, a reaction disk 206, an air valve 208, a power piston 210, a floating control valve seat 212 and a diaphragm 214. The reaction disk 206 may have an input surface 216 and an output surface 218 and may be formed from deformable material, such as hard rubber, plastic or the like. The air valve 208 may have an input surface 220 and the power piston 210 may have an input surface 222, both of which may engage the input surface 216 of the reaction disk 206.

As shown in FIG. 4, two bores 224A, 224B may be formed in the input surface 222 of the power piston 210. However, those skilled in the art will appreciate that any number of bores 224A, 224B may be formed in the input surface 222 without departing from the scope of the present disclosure. In one example, only one bore (not shown) may be formed. In another example, six bores (not shown) may be generally equidistantly spaced about the input surface 222 of the power piston 210.

The bores 224A, 224B may have various shapes and sizes and may be generally aligned with the axis of the power piston 210. Those skilled in the art will appreciate that the bores 224A, 224B may be formed using any available techniques, such as drilling, machining, cutting or the like.

A plunger 226A, 226B may be closely and slidably received within each of the bores 224A, 224B. Each plunger 226A, 226B may have a diameter (or length and width) corresponding closely with the diameter (or length and width) of the associated bore 224A, 224B. Further, the plungers 226A, 226B may have various axial lengths (e.g., about 1 to about 50 percent of the length of the bores 224A, 224B). In one aspect, the bores 224A, 224B and the plungers 226A, 226B may be generally cylindrical in shape.

A spring 228A, 228B may be positioned in each bore 224A, 224B to urge the associated plunger 226A, 226B out of the bore 224A, 224B and resist the forces urging the plungers 226A, 226B into the bores 224A, 224B. In one aspect, the plungers 226A, 226B may be biased to a position such that the plungers 226A, 226B are generally flush with the input surface 222 of the power piston 210. In another aspect, the springs 228A, 228B may be coil springs or other collapsible springs and may have a sufficient resistive force to resist movement of the plungers 226A, 226B into the bores 224A, 224B.

When an input force (arrow D) is applied to the booster 200 by the input rod 202 such that the input surfaces 220, 222 of the air valve 208 and power piston 210 apply a force to the input surface 216 of the reaction disk 206, the springs 228A, 228B may initially resist the force and maintain the plungers 226A, 226B in the distal position (e.g., flush with the input surface 222 of the power plunger 210). However, when the force of the springs 228A, 228B is overcome by the input force (arrow D), the plungers 226A, 226B may be urged in the proximal direction against the bias of the springs 228A, 228B and a portion of the reaction disk 206 may be deformed (e.g., extruded) into the bores 224A, 224B, thereby effectively increasing the area $A_{out}$ of the output reaction surface and effectively decreasing the area $A_{in}$ of the input surface, resulting in an increased output force gain G (see Equation 1).

Thus, a second, higher output force gain G may be provided when the input force (arrow D) is sufficiently high to overcome the resistive force of the springs 228A, 228B in the power piston 210.

Figure 5A:
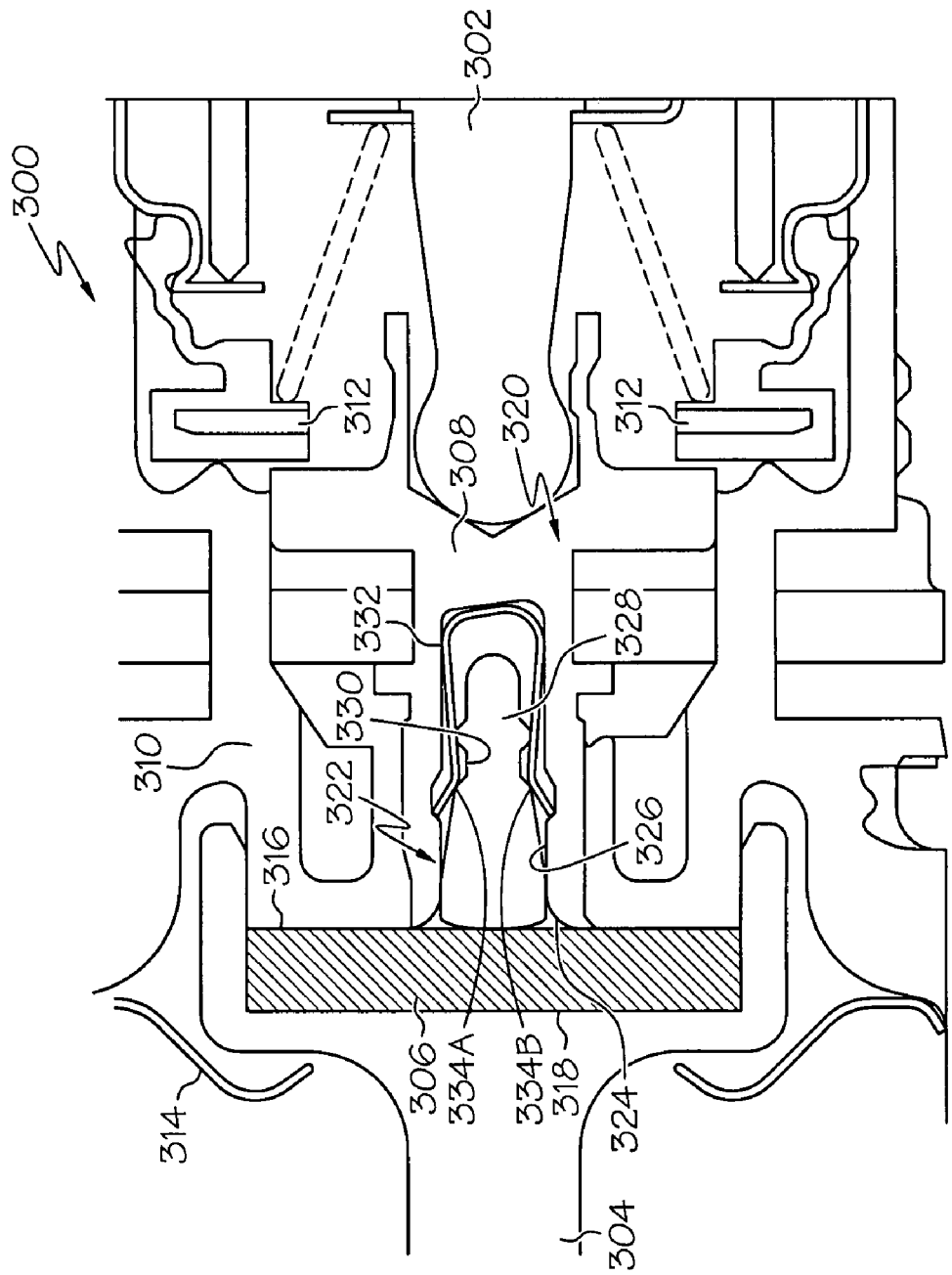
FIG. 5A is a side cross-sectional view of a third aspect of the disclosed variable force rate vacuum booster.

Referring to FIG. 5A, a third aspect of the disclosed variable force rate vacuum booster, generally designated 300, may include an input rod 302, an output rod 304, a reaction disk 306, an air valve 308, a power piston 310, a floating control valve seat 312 and a diaphragm 314. The reaction disk 306 may have an input surface 316 and an output surface 318 and may be formed from deformable material, such as hard rubber, plastic or the like. The air valve 308 may include a proximal end 320 and a distal end 322.

The distal end 322 of the air valve 308 may include an input surface 324 adapted to engage the input surface 316 of the reaction disk 306. A bore 326 may be formed in the input surface 324 of the air valve 308. The bore 326 may have various shapes and sizes and may extend generally axially into the air valve 308. Those skilled in the art will appreciate that the bore 326 may be formed using any available techniques, such as drilling, machining, cutting or the like.

A plunger 328 may be closely and slidably received within the bore 326. The plunger 328 may have a diameter (or length and width) corresponding closely with the diameter (or length and width) of the bore 326. Further, the plunger 328 may have various axial lengths (e.g., about 10 to about 90 percent of the length of the bore 326). In one aspect, the plunger 328 may be generally elongated and may include a circumferential groove 330.

A clip spring 332 may be positioned within the bore 326. The clip spring 332 may include two generally U-shaped legs, each having a forward pinching portion 334A, 334B adapted to apply a pinching force to the plunger 328. In the relaxed configuration, the forward pinching portions 334A, 334B of the clip spring 332 may engage the circumferential groove 330 on the plunger 328, thereby aligning and biasing the plunger 328 to a position generally flush with the input surface 324 of the air valve 308 and resisting retraction of the plunger 328 into the bore 326.

As shown in FIG. 5B, when the pinching force of the clip spring 332 is overcome by the input force (arrow E) applied by the input rod 302, the forward pinching portions 334A, 334B of the clip spring 332 cam over the groove 330 of the plunger 328 such that the plunger 328 is retracted in a proximal direction into the bore 326 against the bias of the clip spring 332. As the plunger 328 retracts into the bore 326, a portion of the reaction disk 306 may be deformed (e.g., extruded) into the bore 326, thereby effectively increasing the area $A_{out}$ of the output reaction surface and effectively decreasing the area $A_{in}$ of the input surface, resulting in an increased output force gain G (see Equation 1). A return spring (not shown) may additionally be provided to return the plunger 328 to the original position once the threshold input force ceases.

Thus, a second, higher output force gain G may be provided when the input force (arrow E) is sufficiently high to overcome the resistive force of the clip spring 332 in the air valve 308.

Figure 6:
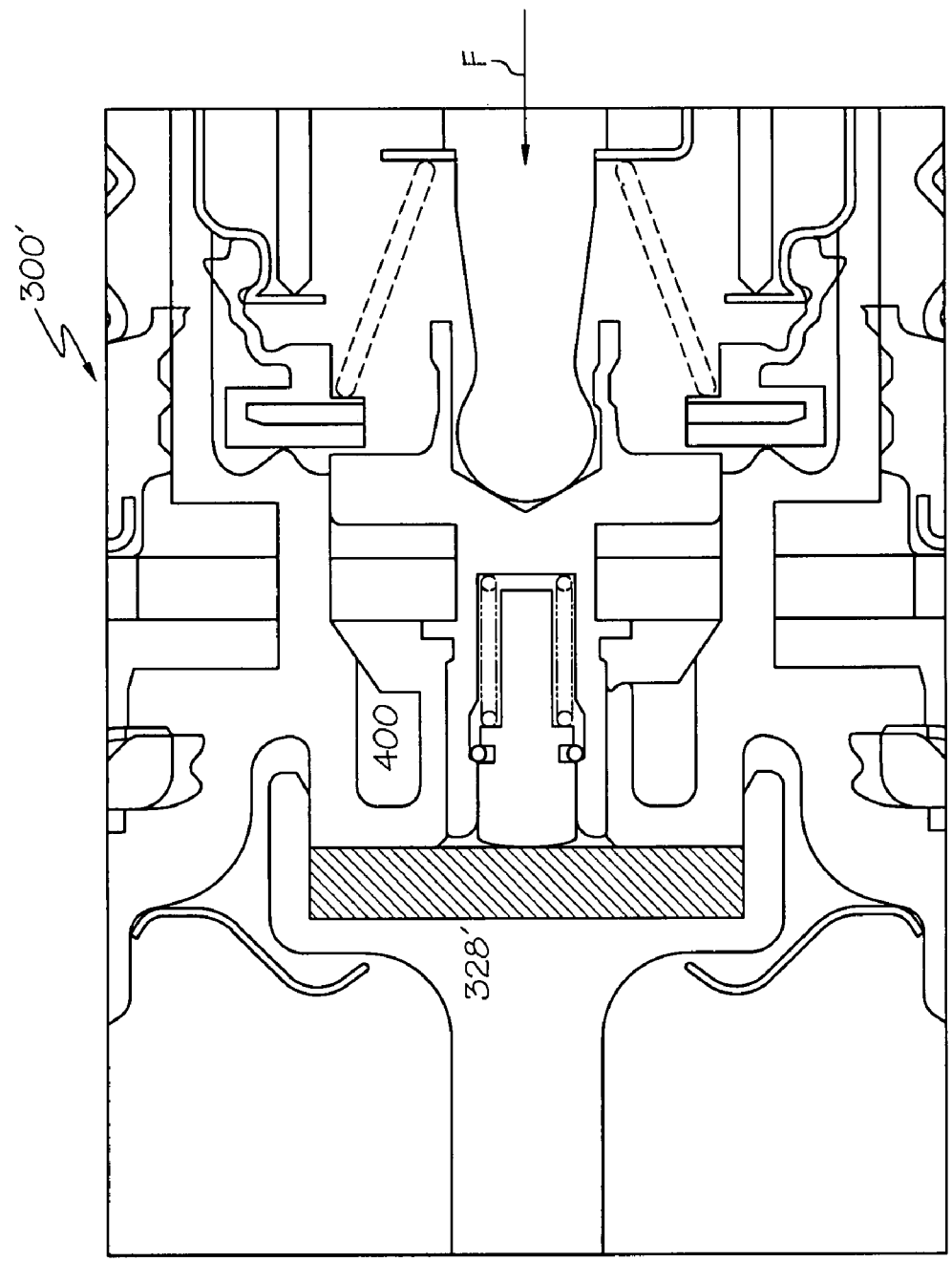
FIG. 6 is a side cross-sectional view of a fourth aspect of the disclosed variable force rate vacuum booster.

As shown in FIG. 6, booster 300' may be a first alternative aspect of the booster 300 illustrated in FIGS. 5A and 5B and may include a bore 326' having a plunger 328' positioned therein. The plunger 328' may be biased to a forward position by a C-ring retaining clip 400 that engages a circumferential groove 402 in the plunger 328'. The C-ring retaining clip 400 may be overcome upon the application of a threshold input force (arrow F), thereby allowing the plunger 328' to retract into the bore 326' such that a portion of the reaction disk 306' may be deformed into the bore 326'. A return spring 404 may return the plunger 328' to the original position once the threshold input force ceases.

Figure 7:
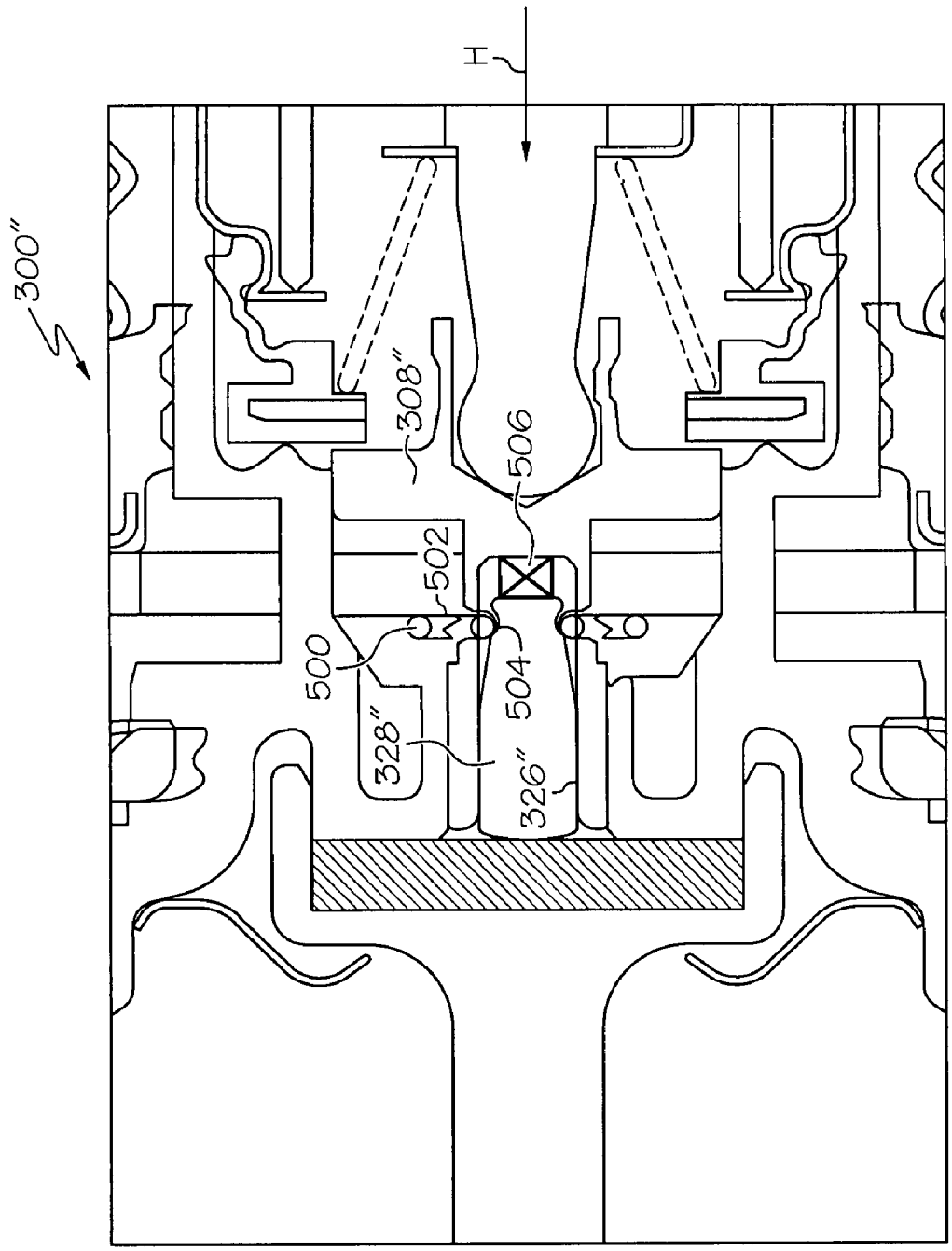
FIG. 7 is a side cross-sectional view of a fifth aspect of the disclosed variable force rate vacuum booster.

As shown in FIG. 7, booster 300" may be a second alternative aspect of the booster 300 illustrated in FIGS. 5A and 5B and may include a bore 326" having a plunger 328" positioned therein. The plunger 328" may be biased to a forward position by a hair-pin spring clip 500 positioned in a groove 502 in the air valve 308", wherein the clip 500 engages a circumferential groove 504 in the plunger 328". The clamping force of the hair-pin spring clip 500 may be overcome upon the application of a threshold input force (arrow H), thereby allowing the plunger 328" to retract into the bore 326" such that a portion of the reaction disk 306" may be deformed into the bore 326". A return spring 506 may return the plunger 328" to the original position once the threshold input force ceases.

Although various aspects of the disclosed variable force rate vacuum booster have been shown and described, modifications may occur to those skilled in the art upon reading the specification. The present application includes such modifications and is limited only by the scope of the claims.

What is claimed is:

1. A variable force rate vacuum booster comprising:
    a reaction disk having an input surface and an output surface, said reaction disk being formed from a deformable material;
    an input rod position relative to said reaction disk to apply an input force to said input surface of said reaction disk;
    an output rod having a reaction surface generally aligned with said output surface of said reaction disk, said output rod defining a bore therein; and
    a plunger positioned in said bore and biased out of said bore by a biasing force, said plunger being adapted to resist deformation of said reaction disk into said bore until said input force reaches a threshold value.

2. The vacuum booster of claim 1 wherein said bore is axially aligned with said output rod.

3. The vacuum booster of claim 1 further comprising a spring positioned in said bore to apply said biasing force to said plunger.

4. The vacuum booster of claim 3 wherein said spring is a coil spring.

5. The vacuum booster of claim 1 wherein said plunger includes a reaction surface and said biasing force urges said reaction surface of said plunger into alignment with said reaction surface of said output rod.

6. The vacuum booster of claim 1 wherein said bore and said plunger are generally cylindrical in shape.

7. The vacuum booster of claim 1 wherein said reaction disk is formed from at least one of a rubber material and a plastic material.

8. A variable force rate vacuum booster comprising:
    a reaction disk having an input surface and an output surface, said reaction disk being formed from a deformable material;
    an output rod having a reaction surface generally aligned with said output surface of said reaction disk;
    a power piston having an input surface generally aligned with said input surface of said reaction disk to apply an input force to said reaction disk, said power piston defining at least one bore in said input surface of said power piston; and
    a plunger positioned in said bore and biased out of said bore by a biasing force, said plunger being adapted to resist deformation of said reaction disk into said bore until said input force reaches a threshold value.

9. The vacuum booster of claim 8 further comprising a spring positioned in said bore to apply said biasing force to said plunger.

10. The vacuum booster of claim 9 wherein said spring is a coil spring.

11. The vacuum booster of claim 8 wherein said plunger includes an input surface and said biasing force urges said input surface of said plunger into alignment with said input surface of said power piston.

12. The vacuum booster of claim 8 wherein said bore and said plunger are generally cylindrical in shape.

13. The vacuum booster of claim 8 wherein said reaction disk is formed from at least one of a rubber material and a plastic material.

14. The vacuum booster of claim 8 wherein said power piston defines at least two of said bores within said input surface of said power piston, said bores being generally equidistantly spaced about said input surface of said power piston.

15. A variable force rate vacuum booster comprising:
a reaction disk having an input surface and an output surface, said reaction disk being formed from a deformable material;
an output rod having a reaction surface generally aligned with said output surface of said reaction disk;
an air valve having an input surface generally aligned with said input surface of said reaction disk to apply an input force to said reaction disk, said air valve defining a bore in said input surface of said air valve; and
a plunger positioned in said bore and biased out of said bore by a biasing force, said plunger being adapted to resist deformation of said reaction disk into said bore until said input force reaches a threshold value.

16. The vacuum booster of claim 15 further comprising a spring positioned in said bore to apply said biasing force to said plunger.

17. The vacuum booster of claim 16 wherein said spring is at least one of a clip spring, a C-ring retaining clip and a hair-pin spring clip.

18. The vacuum booster of claim 15 wherein said plunger includes an input surface and said biasing force urges said input surface of said plunger into alignment with said input surface of said air valve.

19. The vacuum booster of claim 15 wherein said bore and said plunger are generally cylindrical in shape.

20. The vacuum booster of claim 15 wherein said reaction disk is formed from at least one of a rubber material and a plastic material.

* * * * *